3,319,351
TUBULAR EXTRUSION DRYER
Bernard Sprissler, Joppa, and Emerson P. Pease, Baltimore, Md., assignors, by mesne assignments, to the United States of America as represented by the United States Atomic Energy Commission
Filed Mar. 8, 1965, Ser. No. 438,138
4 Claims. (Cl. 34—109)

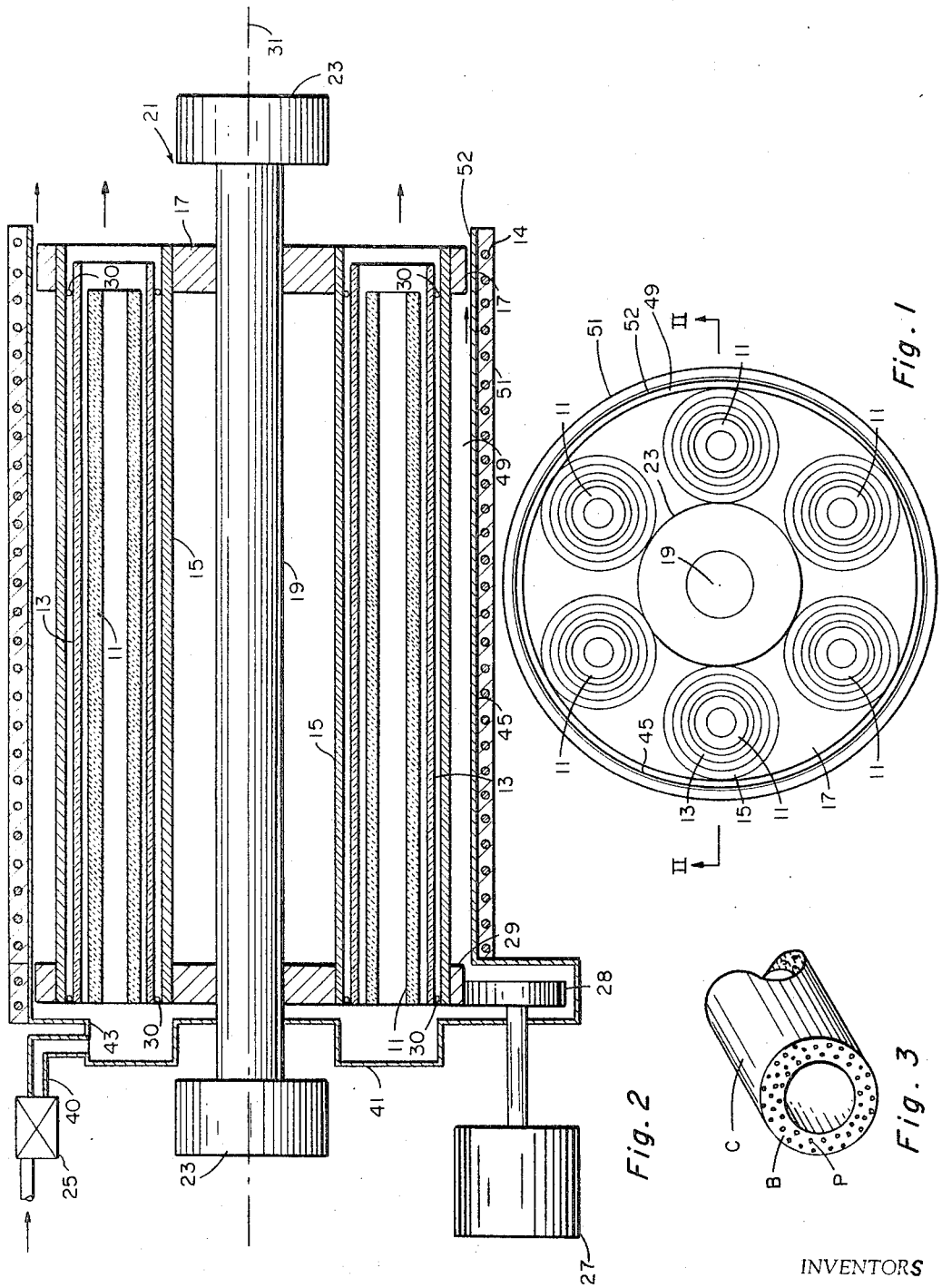

ABSTRACT OF THE DISCLOSURE

A dryer for tubular core extrusions of nuclear fuel particles having an annular array of interfitting tubes for receiving and rotating the extrusions around an axis so as to roll the extrusions within the tubes while blowing air around, over and through the extrusions and heating them.

This invention relates to dryers and more particularly to novel method and apparatus for drying tubular core extrusions for nuclear reactors. This invention was made in the course of, or under a contract with the United States Atomic Energy Commission.

In the preparation of tubular core extrusions for nuclear reactors, it is often desirable to dry the extrusions to remove water therefrom. Various proposals have been made and used to accomplish this drying, comprising allowing the extrusions to sit on a table to allow the moisture to evaporate or heating the extrusions one by one in a heated vacuum retort. While these arrangements have been useful and can accomplish the desired drying, the extruded shape has become elliptical through sagging under its own weight, warped or bowed due to uneven heat transfer, or the outside surface has not been smooth and uniform whereby it has been difficult or impossible to produce a uniform bond betwene the core and a cylindrical cladding. Also, there has been condensation and collection of water around the extrusions during drying of more than one extrusion or a cold trap has been required to protect the vacuum pump from collecting water vapor. It has additionally been desired to reduce the drying time.

It is an object of this invention, therefore, to provide an economical and practical apparatus and method for drying a plurality of tubular core extrusions for nuclear reactors;

It is another object of this invention to provide a drying system for producing a uniform tubular shape from a tubular core extrusions for nuclear reactors;

It is another object of this invention to provide uniformly smooth tubular shaped cores for nuclear reactors;

Another object of this invention is provision for drying tubular extrusions that contain a water base binder without sagging, warping and bowing the extrusions due to uneven heat transfer.

Still another object of this invention is provision for rapidly drying tubular core extrusions of particles and a binder to preserve the uniform distribution of the particles in the extrusion.

By this invention, there is provided a method and apparatus for the drying of tubular core extrusions of spherical nuclear fuel particles uniformly distributed in a plastic water base binder, described in U.S. application S.N. 283,126, entitled "Nuclear Fuel Elements" by Goslee et al. The method and construction involved in this invention utilize standard and well known techniques and apparatus and is highly flexible for a wide range of tubular extrusions, binders and solid particles. More specificially, this invention involves rolling the tubular extrusion in an epicycle by rolling it in a glass tube that is rotated in a circular orbit around a horizontal axis in a vapor removing gas stream while the tubes are heated. The extrusions are arranged in one embodiment, to cooperate with a Nichrome electric heater having therein a rotatable tube rack, comprising an annular array of equally spaced high heat conductivity metallic tubes that hold the glass tubes and are held between end plates having a central shaft that rotates the metallic tubes in a circle around a central horizontal axis whereby the extrusions roll by gravity in the glass tubes while air circulating means blows air around, over and through the metallic, glass and extruded tubes to remove the vapor therefrom. With the proper selection of rotating speeds, gas streams, drying times and components, as described in more detail hereinafter, the desired drying is obtained.

Various other objects and advantages will appear from the following description of two embodiments of the invention, and the novel features will be particularly pointed out hereinafter in connection with the appended claims.

In the drawings where like parts are marked alike:

FIG. 1 is a side view of the drying apparatus of this invention from the open end thereof;

FIG. 2 is a partial cross-section through II—II of the apparatus of FIG. 1;

FIG. 3 is a partial three dimensional view of a tubular extrusion for a nuclear reactor.

Referring to FIGS. 1 and 2, the dried tubular core extrusion 11 of this invention is useful for fabricating tubular fuel elements for nuclear reactors, such as described in U.S. application S.N. 684,501, filed Sept. 16, 1957, now abandoned. Typical sequential steps of the fuel element fabrication process, comprise core extrusion, extrusion drying, core densification, cleaning or conditioning, component assembly with a tubular cladding around the densified core, and finishing for insertion into the reactor. As is understood in the art, densification may comprise sintering, swaging and/or isostatic pressing. It is also understood in the art that the dried core surface must be smooth for properly bonding it to the cladding and the particles in the core should be uniformly dispersed therein.

Advantageously, the cermet core C, shown in FIG. 3, forms the active region of the nuclear fuel element. This core is formed by a slurry extrusion process at room temperature and at relatively low pressure in a low-density tubular form. The core components for drying comprise uniformly dispersed nuclear fuel particles P, such as spherical stainless steel coated $UO_2$ particles. The binder B for extruding these particles, is described for example, in the cited co-pending Goslee et al. application. An extrusion of this type was used in the examples of this invention. In these extrusions that were dried in these examples of this invention, water mixtures of guar gum or starch, such as methylal or methyl-cellulose were used. The binder was varied in an amount from 2.8 wt. percent to 5.8 wt. percent of the total solids and the water content was varied in an amount from 12 wt. percent to 22 wt. percent whereby the extrusions had sufficient strength to be semi-self sustaining. These extrusions were made in the vertical position and carried off in a roller-fitted trough sloping downward at an angle of about 30° from the horizontal.

In accordance with this invention the extrusions 11 are dried immediately after extrusion whereby the extrusions do not take a permanent set. However, the extrusions may have a slightly out-of-round condition. The extrusions are inserted in glass tubes 13, shown in FIG. 1, approximately 25% larger in diameter than the extrusions. If the glass tube diameters are bigger than about 30% of the core diameters or smaller than about 20% of the extrusion diameters the out-of-round condition of the extrusions may not be corrected to a substantially round cross-section, or the heat transfer to the extrusions may not be uniform. Electric furnace coil 14 provides an even heat therein and thermostatically controlled hot air blower 25 removes the moisture from the extrusions and prevents moisture from accumulating on the glass tubes. The glass tubes are placed in aluminum tubes 15 having end plates 17 and connecting shaft 19 to form a rotatable drum 21 that rotates in bearings 23. Motor drive 27 moves the drum by rotating gear 28 against ring gear 29 on drum 21. The drum, in one embodiment, has an annular array of six equally spaced aluminum tubes 15 about 25% bigger in diameter than the glass tubes 13 for uniform heat distribution. Soft cushioning rings 30 hold the glass tubes 13 in their outer metal tubes 15 co-axially with each other. These rings 30 may be asbestos or neoprene.

In operation, motor 27 rotates drum 21 around axis 31 of shaft 19, which is horizontally disposed to rotate each glass tube 13, in its tubular socket 15 around axis 31. This action freely rotates the extrusion 11 by rolling it in an epicycle due to gravity in each glass tube 13 as these tubes 13 rotate around axis 31. One revolution of the drum 21 produces one complete rotation of the glass tubes and extrusions and this rotation produces a gentle, rolling action in the extrusion which preserves the uniform distribution of the particles P in the tubular core extrusions. This gentle rolling also uniformly smooths and makes circular the extrusions. Also, there is uniform heat transfer from the heater while hot air is blown over, around and through the extrusions by blower 25 to remove the moisture therefrom. Advantageously, air blower 25 blows hot air through duct 40 connected to annular duct 41 having a mouth 43 co-axial with the orbits of the extrusions. Annulur duct 45 surrounds drum 21 to transmit the air from duct 41 and the moisture laden air from the extrusions. This moisture laded air passes through the aluminum tubes 15 to the ambient atmosphere. To this end a narrow channel 49 between the drum 21 and duct 45 maintains a positive air flow pressure to force the hot air through aluminum tubes 15, tubes 13 and extrusions 11 uniformly to remove the vapor therefrom. The annular array of aluminum tubes 15 forms a uniform nest of high heat conductivity means that distributes heat uniformly along the length of the glass tubes 13 from heater coil 14. The duct 45 has an open end 52 for inserting the extrusions and glass tubes and is formed by the inside wall of furnace container 51 in which coil 14 is imbedded. The tubes 13 are advantageously glass, since the glass is smooth, hard and uniformly cylindrical whereby the glass tubes 13 do not stick to the extrusions 11. The straightness, smoothness, hardness and roundness of the glass tubes also provides the necessary surface contact to produce uniformly cylindrical and straight extrusions with uniformly smooth surfaces. In this manner the extrusion is uniformly dried in a straight, cylindrical, nearly perfect circular form, and the water is removed in about 4 hours, which is one quarter of the time required by conventional methods.

In one example of the drying method of this invention the following conditions were used:

Air flow through furnace 51—30 c.f.m.
Air temperature out—200° F.
Number of water slurry extrusions of spherical $UO_2$ fuel particles/drying load—6
Diameter of circular orbit of annular array of tubes 15—4"
Rotation rate of drum 21—10 r.p.m.
Drying time—4 hrs.
Extrusion length—36 inches
Extrusion diameter—0.786"
Extrusion wall thickness—0.185"

In the above example, the temperature of the glass tubes 13 is about 200° F. A lower temperature than 180° F. increases the drying time and a higher temperature causes sticking of the extrusions to the tubes 13 before the binder therein is dried. It is also noted that the rotation rate of drum 21 should not be greater than about 15 r.p.m. to prevent densifying the particles P in the outside of the extrusion or uneven heat transfer to the extrusions 11 by holding the extrusions against the inside of glass tubes 13 by centrifugal force. Also, if the rotation is below about 5 r.p.m., the extrusions will not be properly smoothed and/or the drying time will be increased.

In another embodiment of this invention the glass tubes 13 fit freely in the aluminum tubes 15 whereby the glass tubes 13 and the extrusions 11 both roll in epicycles by gravity whereby the extrusions have a gentle rocking motion that speeds up the smoothing process of the extrusions.

This invention provides a simple, effective and efficient system and apparatus for heating a plurality of tubular shaped members to provide even heat transfer from a heating medium to said tubular shaped members. More particularly, this invention has the advantage of drying tubular core extrusions for nuclear reactors to provide a straight, round, cylindrical tubular core having uniformly smooth surfaces. Additionally, this invention provides an epicycle system for drying these extrusions whereby out-of-round tubular extrusions are made round and moisture and/or binders are removed from the extrusions without warping, bowing or bending the extrusions or without moisture accumulation around the extrusions or in the drying apparatus.

What is claimed is:
1. Drying apparatus for tubular core extrusions for nuclear reactors, comprising means consisting of a system of interfitting tubes disposed around said extrusions having means for rotating the tubes in a circular orbit around a horizontal axis for rotating the extrusion therein around said axis for rolling said extrusions within said tubes, means for blowing air around over and through said tubes and said extrusions for removing moisture from said extrusions, and means for uniformly heating said extrusions uniformly to form circular, straight, cores having smooth surfaces.

2. The invention of claim 1 in which said tubes comprise inner and outer tubes wherein said outer tubes are high heat conductivity metal tubes and said inner tubes are glass.

3. The invention of claim 1 in which said tubes comprise inner and outer tubes wherein the outer tube diameters are 25% greater than said inner tube diameters and said inner tube diameters are 25% greater than said extrusion diameters.

4. Drying apparatus for tubular core extrusions for nuclear reactors comprising in annular array of aluminum first tubes, a central rotatable shaft and end plates at the ends of said tubes and shaft, glass second tubes fitting co-axially in said first tubes for freely receiving said extrusions, means for rotating said central shaft to rotate said first and second tubes in a circular orbit around a horizontal axis passing through said shaft, said rotation of said first and second tubes gently rolling said extrusions within said second tubes, means for blowing air around, over and through said first and second tubes and said extrusions for evenly removing vapor from said extrusions, and means having an electric heating furnace around said aluminum first tubes for heating said extrusions without distortion to form uniformly round, straight, cylindrical shaped tubular cores having smooth surfaces for receiving cylindrical claddings to form nuclear fuel elements.

References Cited by the Examiner

UNITED STATES PATENTS

| | | | |
|---|---|---|---|
| 1,822,158 | 9/1931 | Majer | 34—109 |
| 2,087,697 | 7/1937 | Molins | 34—109 X |
| 2,554,705 | 5/1951 | Jewell | 34—21 |
| 2,557,439 | 6/1951 | Kmentt | 34—109 X |
| 2,589,400 | 3/1952 | Koster et al. | 34—1 |
| 2,682,696 | 7/1954 | Milliken | 34—21 |
| 2,779,848 | 1/1957 | Bosomworth et al. | 34—1 X |

FOREIGN PATENTS 625,521  6/1949  Great Britain.

FREDERICK L. MATTESON, Jr., *Primary Examiner.*

C. R. REMKE, *Assistant Examiner.*